Feb. 24, 1931.  H. SCHLAICH  1,794,324
THERMOMETER
Filed March 3, 1924   2 Sheets-Sheet 1
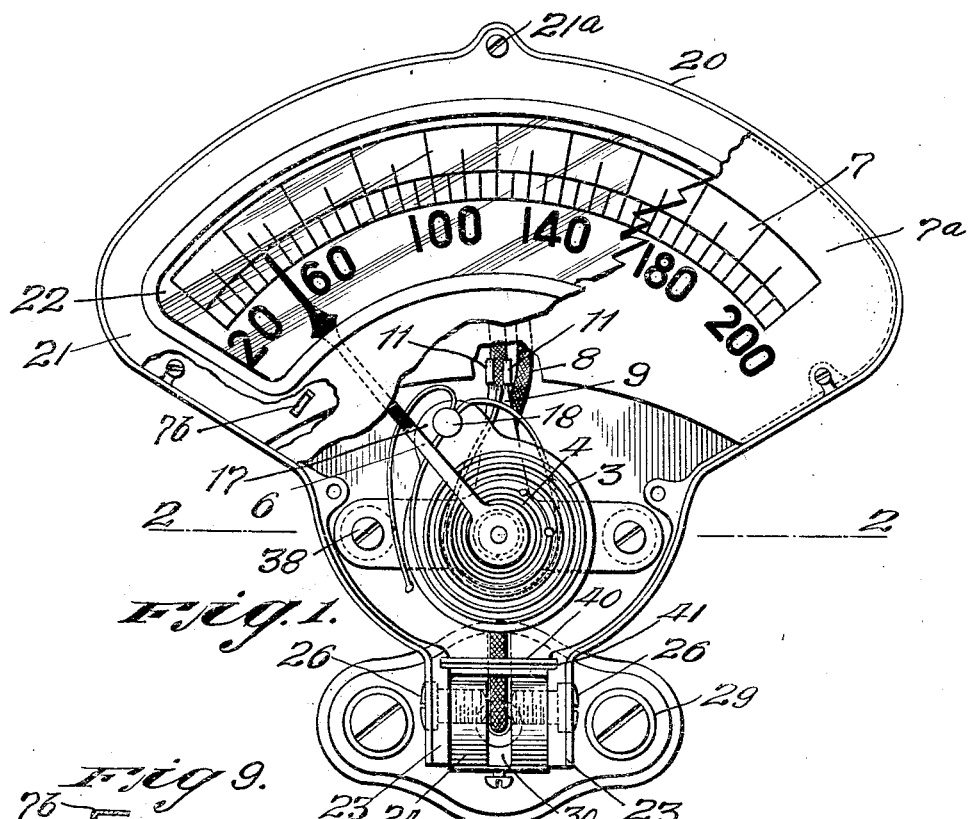

Feb. 24, 1931.   H. SCHLAICH   1,794,324
THERMOMETER
Filed March 3, 1924    2 Sheets-Sheet 2
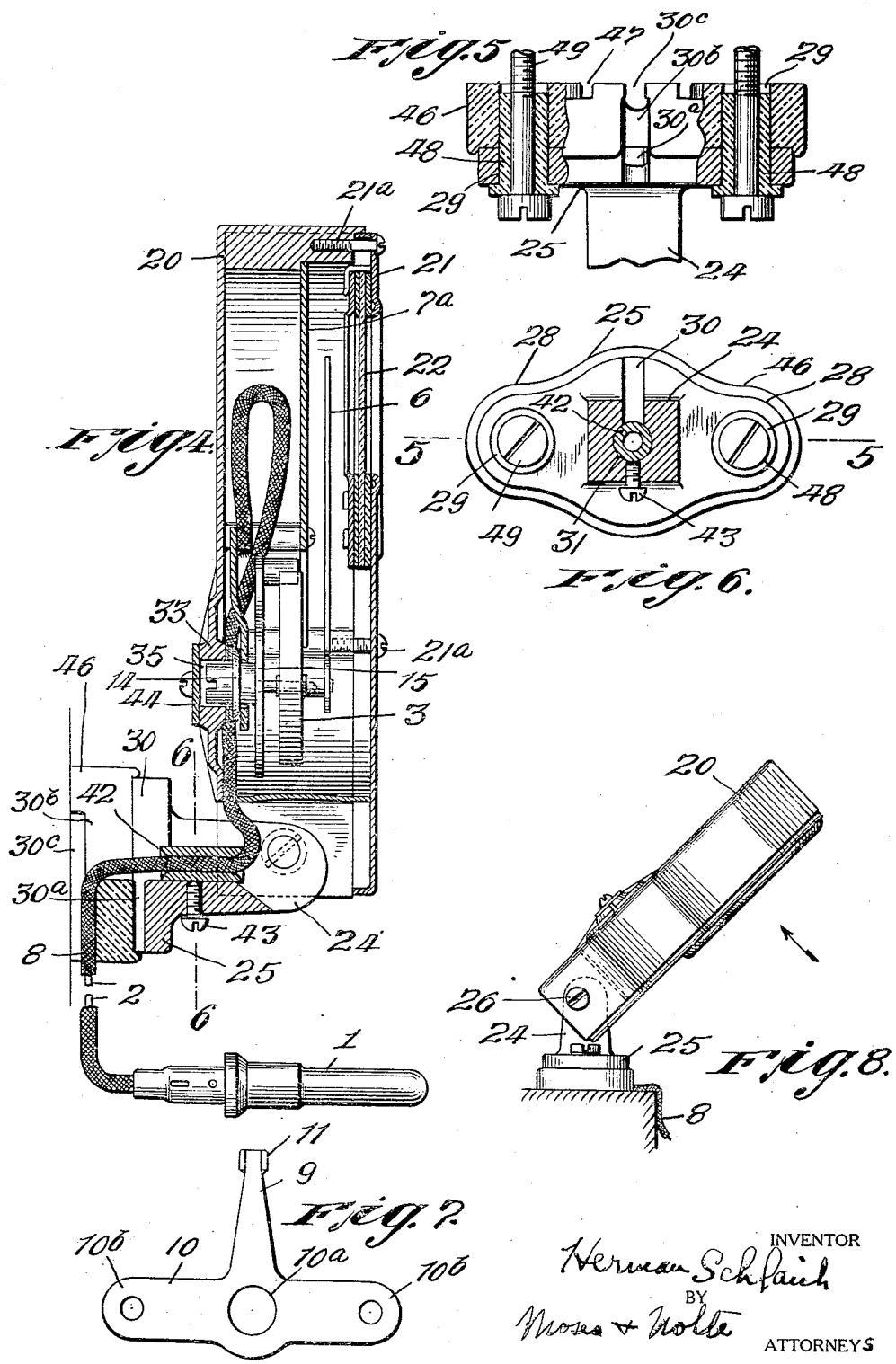

Patented Feb. 24, 1931

1,794,324

UNITED STATES PATENT OFFICE

HERMAN SCHLAICH, OF LONG ISLAND CITY, NEW YORK

THERMOMETER

Application filed March 3, 1924. Serial No. 696,562.

This invention relates to a thermometer of the type in which the indicating portion is located some distance from the object or place whose temperature is being taken.

It is the general object of the invention to improve and simplify the construction of various parts of the thermometer indicating elements so as to produce a more rugged instrument having a wider range of utility than heretofore, and at a lower cost.

Among the specific objects of the invention is to provide a distance type indicating portion which can be pivoted upon a base or supporting bracket and tilted to various positions for convenient reading without interferring with the operation of the indicating parts or the accuracy of the readings.

Another object of the invention is to provide an improved means for mounting the operating coil and pointer in the indicator casing whereby they are accurately located with reference to the scale so that the pointer will be correctly spaced from the scale in all positions of its movement.

Another object of the invention is to provide a frictional mounting for the pointer adjusting means whereby the pointer and actuating coil will be held in the position to which they are adjusted, by the frictional contact between the adjusting means and some stationary part of the instrument.

Various other objects and advantages will appear as the description of the invention proceeds.

Referring now to the drawings, which illustrate preferred embodiments of my invention: Fig. 1 is a front elevation of my improved indicating mechanism, with parts broken away so as to show the operating mechanism thereof. Fig. 2 is a sectional view on the line 2—2 of Fig. 1. Fig. 3 is a detail sectional view showing the means for holding the indicating mechanism frictionally in adjusted position. Fig. 4 is a longitudinal sectional view of the instrument as shown in Fig. 1. Fig. 5 is a sectional view of the supporting bracket and insulating base therefor, taken on the line 5—5 of Fig. 6. Fig. 6 is a sectional view on the line 6—6 of Fig. 4. Fig. 7 is an elevation of the supporting or holding device shown in Fig. 3. Fig. 8 is a view showing the instrument in tilted position relative to its support. Fig. 9 is a detail view showing how the minimum stop for the pointer of the thermometer may be formed.

In the embodiment illustrated, the instrument comprises a bulb 1 connected by means of the flexible tubing 2 to a Bourdon coil 3 which thru the compensating coil 4 turns the hub 5 to move the pointer 6 over the scale 7, it being understood of course that the bulb 1, tube 2 and Bourdon coil 3 are filled with a suitable temperature responsive fluid which expands or contracts upon changes in temperature to coil or uncoil the Bourdon tube and actuate the pointer.

To protect the tubing, it is covered with a stranded or armoured cable 8 which extends from the bulb 1 to the arm 9 of the spindle support 10 where it is anchored in the malleable fingers 11.

Rotatably mounted in a hole 10$^a$ in the spindle support 10 is a spindle carrier which comprises a screw headed arbor 13 provided on one side of the support 10 with a collar 14 which rests in frictional contact with the support, and on the other side of the support with a plate 15 which is fixed on said spindle carrier. The spindle 16 projects outwardly from the arbor to provide a pivot or axle for the hub 5. An extension 17 on the plate 15 supports a stud 18 to which one end of the Bourdon coil is fixed, so that when the arbor 13 and plate 15 are turned, the position of the Bourdon coil 3 and pointer 6 is shifted relative to the scale 7 to adjust or correct the readings of the indicating hand 6 upon the scale.

The indicator housing comprises a substantially sector shaped box 20, provided with a detachable cover 21 secured to the box by means of the screw 21$^a$. The scale plate 7$^a$, carrying the scale 7, is mounted in the upper end of the housing, and opposite the scale plate the cover is provided with a window 22 of glass or the like thru which the scale 7 and the end of the pointer 6 may be observed.

The lower ends of the wall of box 20 are extended downward to provide a pair of spaced lugs or ears 23 adapted to receive between them the lug 24 of the bracket 25 and to be pivoted thereto by means of the screws 26.

The bracket 25 has the wing members 28 provided with bolt holes 29 by which the bracket may be secured to a suitable support. Formed in the top of the bracket 25 is a slot 30 terminating in a circular recess 31, the function of which will be described later.

To facilitate the mounting of the pointer actuating mechanism in the housing, and to insure correct spacing of the pointer from the scale at all points of its movement, a plurality of bosses 32 and 34 on the front or inner face of the rear wall of the housing 20 and a boss 33 on the outer or rear face of said wall are drilled to provide holes 35, 36 and 37 for receiving one end of the arbor 13 and the screws 38 for securing the actuating mechanism in the casing, and are planed with their front surfaces parallel with the scale 7, so that the actuating mechanism is properly located with reference to the scale and housing when it is mounted therein.

In assembling the parts of the instrument heretofore described, the arbor 13 is inserted in the spindle support 10; and the plate 15 with the Bourdon coil 3, the compensation coil 4, hub 5 and pointer 6, attached thereto, is secured to the arbor with the hub 5 fitting rotatably upon the spindle 16, it being understood, of course, that the tube 2 and bulb 1 are connected with the coil 3 before it is attached to the post 18 in the plate 15. The end of the cable 8 then is anchored in the fingers 11 and the apparatus is ready to be mounted in the housing.

As shown in Fig. 3, the support 10 is of a bowed shape, so that when the ends 10$^b$ thereof are secured to the bosses 32 and 34 by the screws 38, the back portion of the collar 14 of the arbor 13 will be pressed against the front of the boss 33, or against the washers 39 interposed between the collar and the boss, thereby holding the arbor against the boss and in frictional contact therewith. It is to be understood of course that prior to the mounting of the coil in the casing the front of boss 33 has been planed parallel with the plane of the scale 7, so that when the coil is mounted in the casing, as just described, the pointer will be positioned so as to travel properly over the scale plate in all positions.

The tubing 2 and cable 8 therearound extend out between the lugs 23 at the bottom of the casing which may be closed by means of a slide plate 40 which is received in the grooves 41 near the top of the lugs 23. This plate is provided with a notch which fits around the cable 8 without compressing the cable and tubing, and is waved, as shown in Fig. 4, so as to engage the walls of its grooves 41 tightly enough to retain the slide plate in place.

The bracket support 25 is now attached between the lugs 23 and secured therein by the screws 26. The cable 8 with the tubing 2 therein is inserted in the slot 30 in the bracket 25 and the thimble 42, which is slipped on the cable 8 before the bulb is attached, is pushed into the hole 31 and fastened therein by the set screw 43 so as to prevent the cable and tubing from being withdrawn from the bracket. A groove 30$^a$ in the base of bracket 25 is provided for the cable 8 and tube 2 to pass between the base of the bracket and the support to which it is secured.

To adjust the pointer 6 and coil 3 relative to the scale 7 after the coil is mounted in the casing, a screw driver is inserted thru the hole 35 and into the screw driver slot in the head of the arbor 13, and the arbor, together with the plate 15, coil 3 and pointer 6 is turned to the desired position. The pressure between the back of the collar 14 and the boss 33 is sufficient to frictionally hold the parts in any position to which they are adjusted. A portion 7$^b$ struck out of the scale plate 7$^a$ and bent forward as illustrated in Fig. 9 projects into the path of the pointer 6 and forms a stop to limit the downward movement thereof.

To prevent unauthorized tampering with the adjustment of the instrument, the hole 35 is closed by a plate 44, secured to the casing at each end by the screws 45 which project into the holes 36 and 37.

A hard rubber insulator 46 may be used in conjunction with the bracket 25 to insulate the indicating device and casing from the effects of local heat, if desired. The insulator 46 is preferably also provided with slots 30$^b$ and 30$^c$ for receiving the cable 8. The recesses 47, between the base of the insulator and the support upon which it is mounted, provide air passages which assist in insulating and cooling the thermometer casing to prevent local heat from affecting the readings. The insulating bushings 48 in the holes 29 of the bracket 25 prevent contact of the bracket with the metal screws 49.

Fig. 8 illustrates how this thermometer, thru the flexibility of the cable 8 and tubing 2, and the pivotal mounting of the casing 20 upon the bracket 25, can be tilted to various positions relative to its support and can be read with ease in any position in which it may be adjusted.

In compliance with the patent statutes, I have illustrated and described in detail the preferred embodiment of my invention, but it is to be understood that various modifications can be made in the embodiment shown without departing from the spirit of the invention or the scope of the appended claims.

What I claim is:

1. In a distance type thermometer, the combination of a temperature responsive element, a housing, an indicating mechanism mounted in the housing, a support for the housing, a pivot between the housing and its support enabling the housing to be tilted relative to the support and independently of the temperature responsive element, a continuous flexible capillary, pressure transmitting tube of minute bore as compared with the cross section of the temperature responsive element, forming a direct, unbroken connection between the temperature responsive element and the operating mechanism, and means guarding said tube and guiding it toward the pivot but terminating short of the pivot in proximity to the housing, said tube being sufficiently flexible to offer no substantial opposition to the adjustment of the housing.

2. In a distance type thermometer, the combination of a temperature responsive element, a housing, an indicating mechanism mounted in the housing, a support for the housing, a pivot between the housing and its support enabling the housing to be tilted relative to the support and independently of the temperature responsive element, a permanently sealed, pressure transmitting tube connection between the temperature responsive element and the indicating mechanism extending through the support and into the housing, said connection being so flexible that it offers no substantial opposition to the tilting of the housing, and means fixed with relation to the support for guiding the tubing to the housing in proximity to the pivot.

3. In a thermometer of the type described, the combination of a temperature responsive element, an indicating mechanism, a housing for the indicating mechanism, a support for the housing, a pivot between the housing and its support enabling the housing to be tilted, a flexible, armored conduit connecting the indicating mechanism for operation from the temperature responsive element, and means slidingly supporting the armored conduit in the support at a distance from the pivot, the conduit being free to shift longitudinally and to flex transversely to accommodate tilting of the housing.

4. In a thermometer of the type described, the combination of a housing for the indicating mechanism, a temperature responsive element, a flexible conduit extending from the housing to the temperature responsive element, a supporting bracket pivoted to said housing, said bracket having a slot therein including a circularly recessed portion, and a thimble in said recess extending transversely of the pivot, thru which the conduit passes.

5. In a thermometer of the type described, the combination of a housing having a hole thru its back, an indicating mechanism adjustably mounted in frictional engagement with the housing, means on the indicating mechanism projecting into the hole to permit adjustment of said indicating mechanism from the outside of the housing, and means on the outside of said housing for closing said hole.

6. In an instrument of the type described, a rotatably mounted spindle carrier, a spindle carried thereby, a hub rotatably mounted on said spindle, a Bourdon tube spirally wound and at its inner end operatively connected to said hub, means for attaching the outer end of said tube to said spindle carrier, a pointer operatively connected to said hub, and a scale arranged in cooperative relation to said pointer.

7. In an instrument of the type described, a rotatably mounted spindle carrier, a spindle carried thereby and projecting axially therefrom, a hub rotatably mounted and free to move axially on said spindle, a Bourdon tube spirally wound and at its inner end operatively connected to said hub, means for attaching the outer end of said tube to said spindle carrier, whereby the position of the hub axially on the spindle is determined, a pointer operatively connected to said hub, and a scale arranged in cooperative relation to said pointer.

8. In an instrument of the type described, a casing, an arbor rotatably mounted in said casing, a plate carried by said arbor, a spindle carried by said arbor and projecting axially therefrom, a hub rotatably mounted on said spindle, a Bourdon tube spirally wound and at its outer end attached to said plate and at its inner end operatively connected to said hub, a pointer operatively connected to said hub, and a scale carried by said casing with which said pointer cooperates.

9. A distance type thermometer comprising a temperature responsive element, indicating mechanism, a bracket on which the indicating mechanism is hingedly mounted, capillary tubing operatively connecting the temperature responsive element and the indicating mechanism, said tubing extending substantially at right angles to the hinge axis, and means limiting the bending of the capillary tubing adjacent said hinge.

10. In an instrument of the kind described, the combination with indicating means, of resilient coil means for operating said indicating means, a fixed bearing member, and a support for said indicator means pivoted on said bearing member, said coil means having one end substantially fixed against movement longitudinally of the bearing member and the opposite end fixed to said support, said support being held to the bearing member solely by the coil means, and said coil means being sufficiently yieldable longitudinally of the bearing member and the support to enable the support to be removed from the bearing member to expose the bearing surfaces of the bearing member and the support for cleaning while the support is held connected to the instrument by said coil means.

11. In an instrument of the kind described, the combination with indicating means, of resilient, coil means for operating said indicating means, a fixed bearing member extending into the coil means axially thereof, and a support for the indicating means pivoted supported by the bearing member and extending into the coil means axially thereof, said coil means having one end thereof substantially fixed with relation to the bearing member, and the opposite end fixed to said support, the coil means constituting the sole means for holding the support to the bearing member and being sufficiently yieldable longitudinally of the bearing member and the support to enable the support to be removed from the bearing member while held connected to the instrument by said coil means.

12. In an instrument of the kind described, the combination with indicating means, of resilient coil means for operating said indicating means, a fixed bearing shaft, and a supporting hub for said indicating means pivoted on said bearing shaft, said coil means having one end substantially fixed against movement longitudinally of the bearing shaft and the opposite end fixed to said hub, said hub being held to the bearing shaft solely by the coil means with capacity for removal from the bearing shaft.

In testimony whereof I have affixed my signature to this specification.

HERMAN SCHLAICH.